United States Patent [19]

Kurumada et al.

[11] Patent Number: 5,031,171
[45] Date of Patent: Jul. 9, 1991

[54] CENTERING MECHANISM FOR AUTOMOTIVE DISC PLAYER

[75] Inventors: Masakazu Kurumada; Kiyoshi Morikawa; Kazuo Kobayashi; Yoshinori Yamada; Masanori Sugihara, all of Saitama, Japan

[73] Assignee: Pioneer Electronic Corporation, Tokyo, Japan

[21] Appl. No.: 499,754

[22] Filed: Mar. 27, 1990

[30] Foreign Application Priority Data

Mar. 27, 1989 [JP] Japan .................................. 1-71867
Mar. 31, 1989 [JP] Japan .................................. 1-83724

[51] Int. Cl.⁵ ...................... G11B 23/00; G11B 25/00; G11B 33/02; G11B 5/016
[52] U.S. Cl. .................. 369/270; 369/75.1; 369/75.2; 369/77.1; 369/77.2; 360/99.02; 360/99.06
[58] Field of Search ............ 369/77.2, 77.1, 75.1, 369/75.2, 270, 194; 360/99.02, 99.06

[56] References Cited

U.S. PATENT DOCUMENTS

| | | | |
|---|---|---|---|
| 4,497,051 | 1/1985 | Takahashi et al. | 369/77.1 |
| 4,498,162 | 2/1985 | Schatteman | 369/194 X |
| 4,625,304 | 11/1986 | Kanamaru et al. | 369/77.1 X |
| 4,734,813 | 3/1988 | Bessho | 360/99.06 X |

FOREIGN PATENT DOCUMENTS

| | | |
|---|---|---|
| 200705 | 12/1986 | European Pat. Off. . |
| 0206831 | 12/1986 | European Pat. Off. ........... 369/77.1 |
| 296829 | 12/1988 | European Pat. Off. . |
| 3346483 | 6/1984 | Fed. Rep. of Germany . |
| 3402491 | 8/1984 | Fed. Rep. of Germany . |

Primary Examiner—Stuart S. Levy
Assistant Examiner—Tien Ba Pham
Attorney, Agent, or Firm—Sughrue, Mion, Zinn Macpeak & Seas

[57] ABSTRACT

A disc reproducing apparatus is disclosed in which a large- or small-diameter disc inserted through a disc inserting opening is transferred to a predetermined position within a player, a clamper arm extending over a turntable on which the disc is placed is operated to fix the disc onto the turntable, and information recorded in the disc is reproduced by rotating the turntable. A pair of stopper arms are disposed on the clamper arm, each of which having an abutment which abuts the periphery of the disc. The pair of stopper arms are disposed such that when the small-diameter disc arrives at the predetermined position on the turntable, the angle made by the longitudinal axis of the respective stopper arms is smaller than the angle made by the radial lines connecting each stopper and the center of the small-diameter disc, but greater than the angle made by the radial lines connecting each stopper and the center of the large-diameter disc when the large-diameter disc is place.

2 Claims, 7 Drawing Sheets

CENTERING MECHANISM FOR AUTOMOTIVE DISC PLAYER

BACKGROUND OF THE INVENTION

This invention relates to a disc player having a centering mechanism which, in inserting a disc into the disc inserting opening thereof, operates to position the disc at the center of the disc inserting opening.

Recently, a compact disc has been developed which has a recording layer having pits corresponding to digital signals obtained by converting analog sounds (hereinafter referred to as "a disc"). With the disc, analog sounds are optically reproduced by using a laser beam applied by the reading head of a CD (compact disc) player. The disc is much superior both in tone quality and in operability to conventional LP record discs. Hence, the compact disc together with its CD player has quickly come into wide use. Accordingly, CD players to be mounted on vehicles have been developed. One example of the vehicle disc player is as shown in FIG. 1. In FIG. 1, reference numeral 101 designates a disc of 12 cm in diameter in which pieces of music have been recorded. When the disc 101 is inserted into a disc inserting opening 102, it is conveyed to a predetermined position (which is substantially the center of the CD player) by a loading mechanism 103, where it is fixedly mounted on the turntable 105 by a clamper arm 104. The disc 101 thus mounted is rotated by a spindle motor (not shown), so that the pieces of music are reproduced with a reading head (not shown). In the reading head are supported in floating manner so that they are substantially free from vibration during traveling.

On the other hand, a disc 106 of 8 cm in diameter, which is much smaller in diameter than the disc 101 of 12 cm in diameter, has been proposed in the art.

However, such a prior art CD player is constructed such that when a small-diameter disc 106 is to be inserted into the disc inserting opening, care must be taken to guide the disc so that the center of the disc is aligned with the center of the disc inserting opening. If the disc 106 inserted through the disc inserting opening 102 is not reasonably aligned with its supposed insertion path, the disc is not transferred to a predetermined position. Since the automotive CD player is subjected to vibration while the vehicle is running, extreme care must be taken when the small-diameter disc is to be inserted into the middle of the disc inserting opening 102.

Thus, one possible solution to this problem is to provide near the disc inserting opening 102 a centering mechanism that allows the disc 106 to be positioned in the middle of the disc inserting opening 102. This centering mechanism permits the disc 106 to be transferred passing through the center of the disc inserting opening to the turntable and then clamps the disc onto the turntable by means of the clamp arm.

When the CD player is tilted for some reason while the vehicle is running, the disc inserting opening 102 is also inclined causing the center of the disc to be misaligned with the center of the turntable since the turntable is supported in a floating condition with shock absorbing effect. In which case, guiding the disc at the center position of the disc inserting opening 102 by holding the disc for a long time may cause the disc to become rather misaligned with the clamp position on the turntable where the disc is supposed to clamped, disturbing the operation of the centering mechanism provided on float-supporting mechanism.

The present invention contemplates the above drawbacks, and is to provide a disc reproducing apparatus, in which the centering mechanism permits the disc to be easily inserted into the center position of the disc inserting opening even when the vehicle CD player undergoes vibration while the vehicle is running, and the centering mechanism provided at the disc inserting opening does not disturb the operation of the centering mechanism provided in the floating supporting mechanism.

On the other hand, with the prior art CD player, the clamp position is a position where the inserted disc 101 having a diameter of 12 centimeters is transferred till it abuts the stopper to be blocked. The small-diameter disc 106 inserted through the disc inserting opening of eight centimeters is transferred till it abuts the stopper, then the disc will be transferred too far beyond the clamp position, resulting in difficulty in clamping the disc. The present invention also contemplates the above mentioned drawback and an object of the invention is to provide a disc reproducing apparatus in which the small-diameter disc inserted into the disc inserting opening can be accurately positioned at the clamp position on the turntable.

SUMMARY OF THE INVENTION

According to the present invention, there is provided a disc reproducing apparatus in which when a disc inserted through a disc inserting opening arrives at a predetermined position within a player, a clamper arm operates to fix the disc onto the turntable, and information recorded in the disc is reproduced by rotating the turntable; a centering mechanism for directing the inserted disc to the center of the disc inserting opening is provided in the vicinity of the disc inserting opening; said centering mechanism includes a pair of centering arms 13, 14 which are pivotally supported in a spaced relation and provided with a pair of abutments, and a centering lever 15 which is connected between said pair of centering arms 13, 14 and reciprocally movable in the disc insertion direction; said centering lever 15 is provided with a guiding groove 125 for guiding the operation thereof, which engages a guiding pin 126 provided to the frame side of the disc inserting opening; and when the inserted disc abuts the pair of centering arms 13, 14 to push the centering lever 15 in the disc insertion direction, said guiding pin 126 disengages said guiding groove 125 to release the centering lever 15 at a position intermediate the stroke of the movement thereof.

Since the automobile CD player is mounted to primarily a front panel, the vehicle CD player vibrates while the vehicle is running. An operator must pay attention when he inserts the disc into the middle of the disc inserting opening. The disc may be positioned without being misaligned at the center of the disc inserting opening with the aid of the centering mechanism provided in the vicinity of the disc inserting opening.

Shortly after the disc is positioned at the center of the disc inserting opening by the disc centering mechanism, the guiding groove formed on the centering lever disengages the guiding pin, being free to rotate. Thus the disc is no longer restrained in its movement by the centering mechanism. In other words, the centering mechanism only assists the initial insertion of the disc into the center of the disc inserting opening. Thereafter the disc is no longer under the control of the centering mechanism when the loading mechanism begins to deliver the disc to the turntable. The disc is then guided by another centering mechanism provided in the floating mechanism. Thus, the disc is reliably transferred to the clamp position.

According to another aspect of the invention, there is provided a disc reproducing apparatus in which a large- or small-diameter disc inserted through a disc inserting opening is transferred to a predetermined position within a player, a clamper arm extending over a turntable on which the disc is placed is operated to fix the disc onto the turntable, and information recorded in the disc is reproduced by rotating the turntable, a pair of stopper arms are disposed on said clamper arm, each of which having an abutment which abuts the periphery of the disc; said pair of stopper arms are disposed such that when said small-diameter disc arrives at said predetermined position on the turntable, the angle made by the longitudinal axis of the respective stopper arms is smaller than the angle made by the radial lines connecting each stopper and the center of the small-diameter disc, but greater than the angle made by the radial lines connecting each stopper and the center of the large-diameter disc when said large-diameter disc is placed.

The small-diameter disc inserted through the disc inserting opening is transferred to a position above the center of the turntable. When the disc takes up the clamp position at the center of the turntable, the disc abuts the abutments on a pair of stopper arms to stop thereat, which abutments are mounted to the clamper arm extending over the turntable and is in a radial direction of the small-diameter disc. Thus, the disc is reliably clamped onto the turntable.

On the other hand, the large-diameter disc transferred toward the turntable abuts the stopper arm before the clamp position. At this time the stopper arm is not in the radial direction of the large-diameter disc, and therefore the stopper is caused to pivot by the disc in the direction in which the disc is moving till the disc abuts the conventional stopper member to stop at the clamp position.

DESCRIPTION OF THE PREFERRED EMBODIMENTS

One embodiment of this invention will be described with reference to the accompanying drawings. FIGS. 2 through 10 show one example of a vehicle CD player according to the invention.

Figure 1:
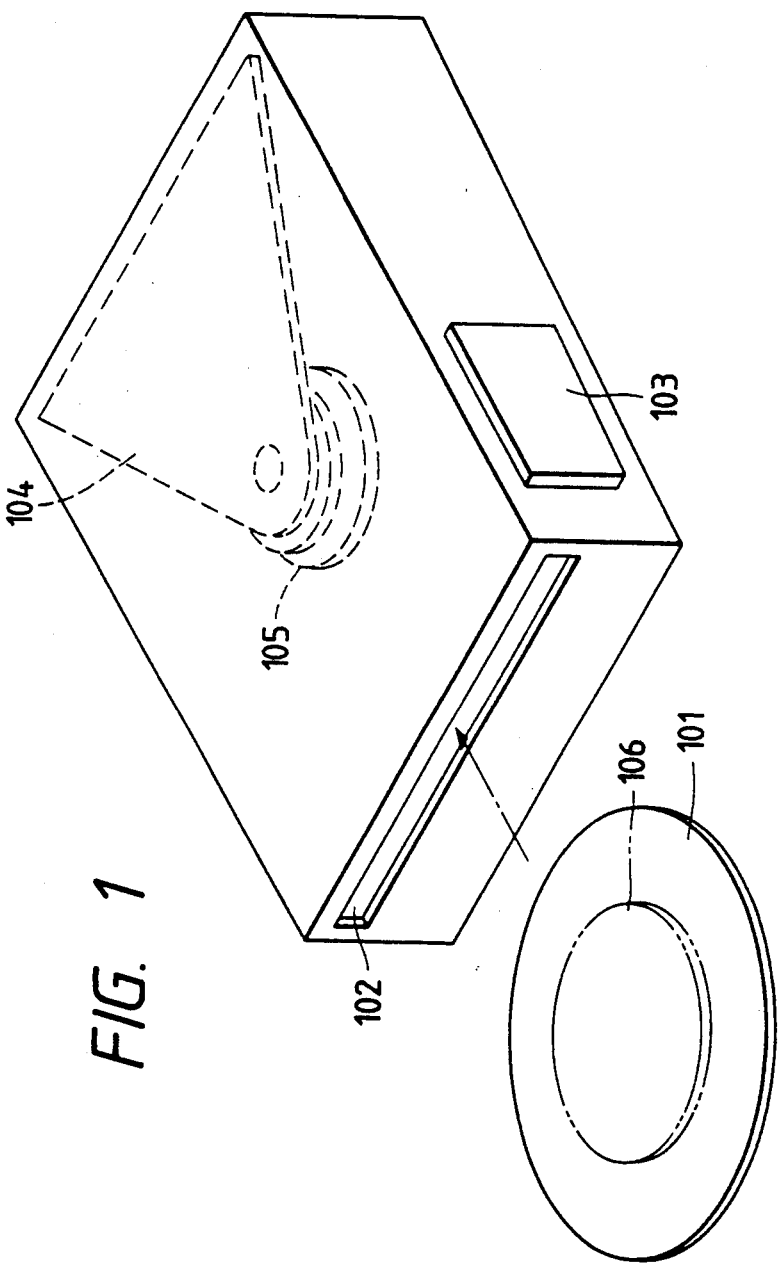
FIG. 1 is a perspective view of a conventional vehicle CD player.
Figure 2:
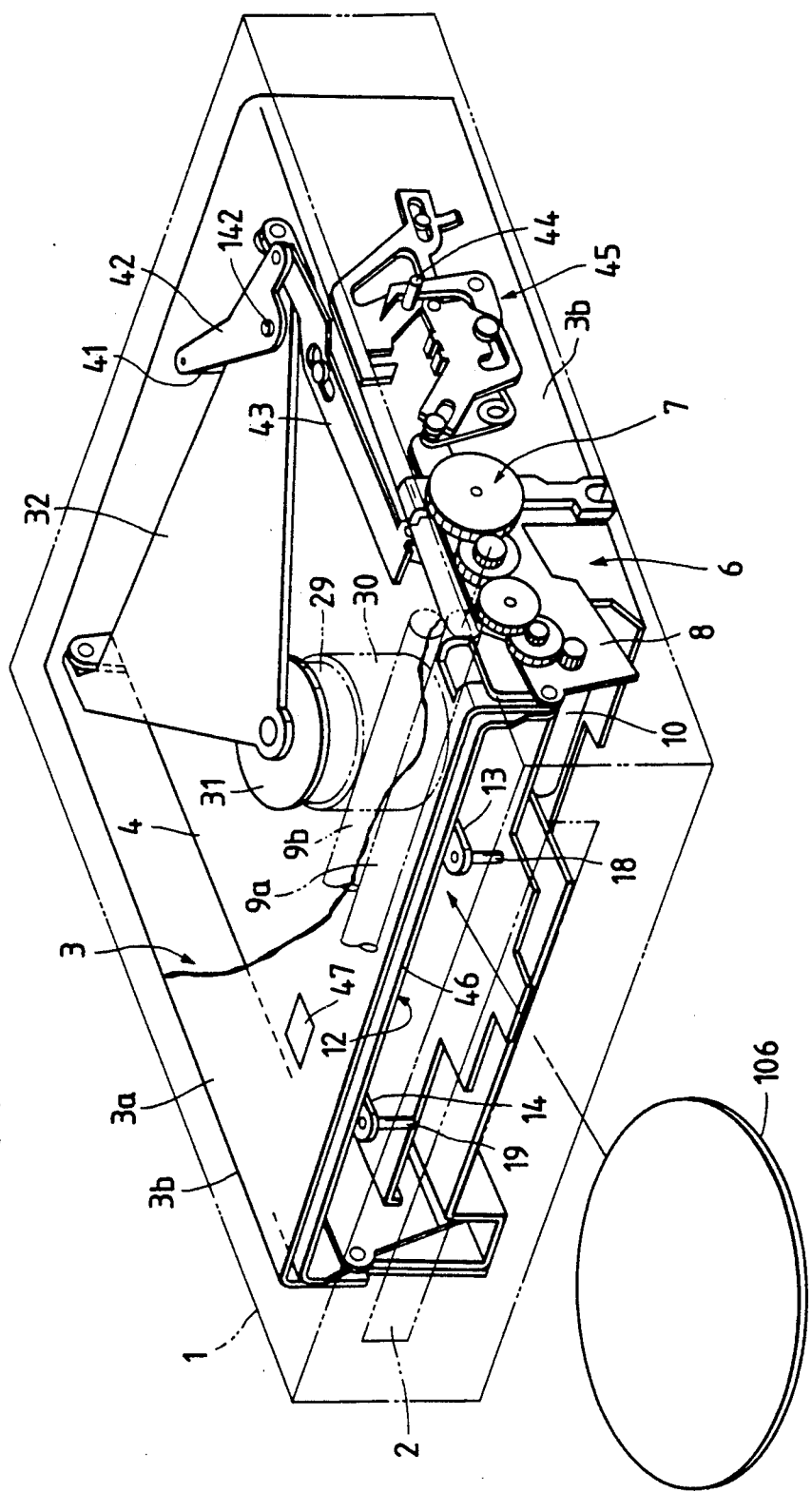
FIG. 2 is a perspective view showing one example of a vehicle CD player according to this invention.
Figure 3:
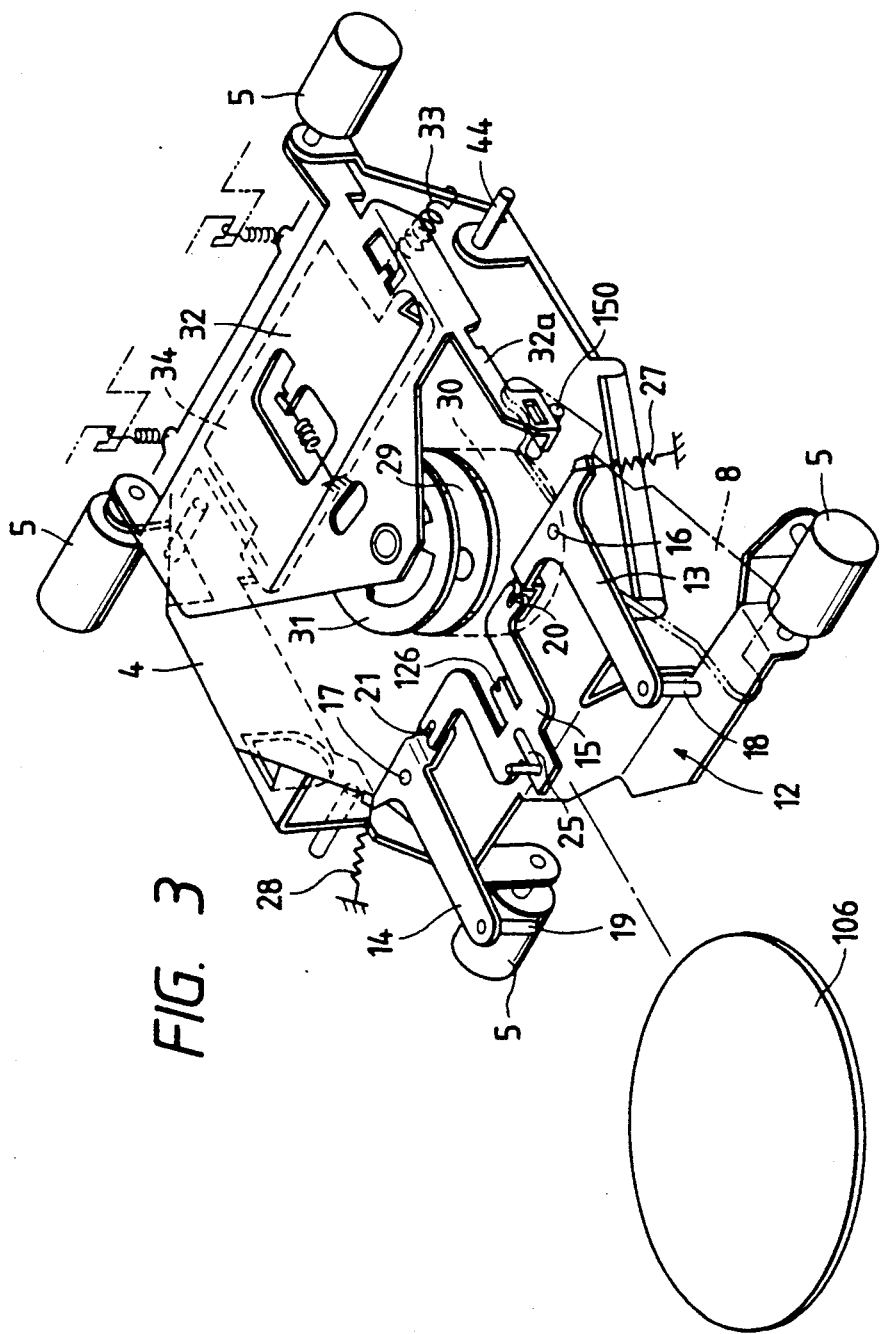
FIG. 3 is a perspective view showing a supporting frame with a centering mechanism.

In FIG. 2, reference numeral 1 designates the casing of the vehicle CD player according to the invention. A disc inserting opening 2 is formed in the front wall of the casing 1. A frame 3 is provided in the casing 1. The frame 3 is made up of a top plate 3a which is substantially in the form of a flat plate, and side plates 3b and 3c extending downwardly from both ends of the top plate 3a. A supporting frame 4 as shown in FIG. 3 is provided inside the frame 3. A well-known reproducing means (not shown) for reproducing music recorded in discs is mounted on the supporting frame 4 is supported through dampers 5 by the frame 3 in floating manner. A loading mechanism 6 and a loading arm lowering mechanism 7, which are used to move a disc 101 inserted into the disc inserting opening 2 to a predetermined position (substantially the center of the supporting frame 4) are provided through a loading arm 8 on one side of the front end portion of the frame 3. The loading mechanism 6 has a driving roller 9a which is supported by the supporting frame 4. A loading motor 10 is provided in the frame 3 at the front end portion to rotate the driving roller 9a. The driving roller 9a thus rotated delivers the disc 106 inserted into the disc inserting opening 2 to the predetermined position in cooperation with a driven roller 9b engaged with the driving roller 9a.

Figure 4:
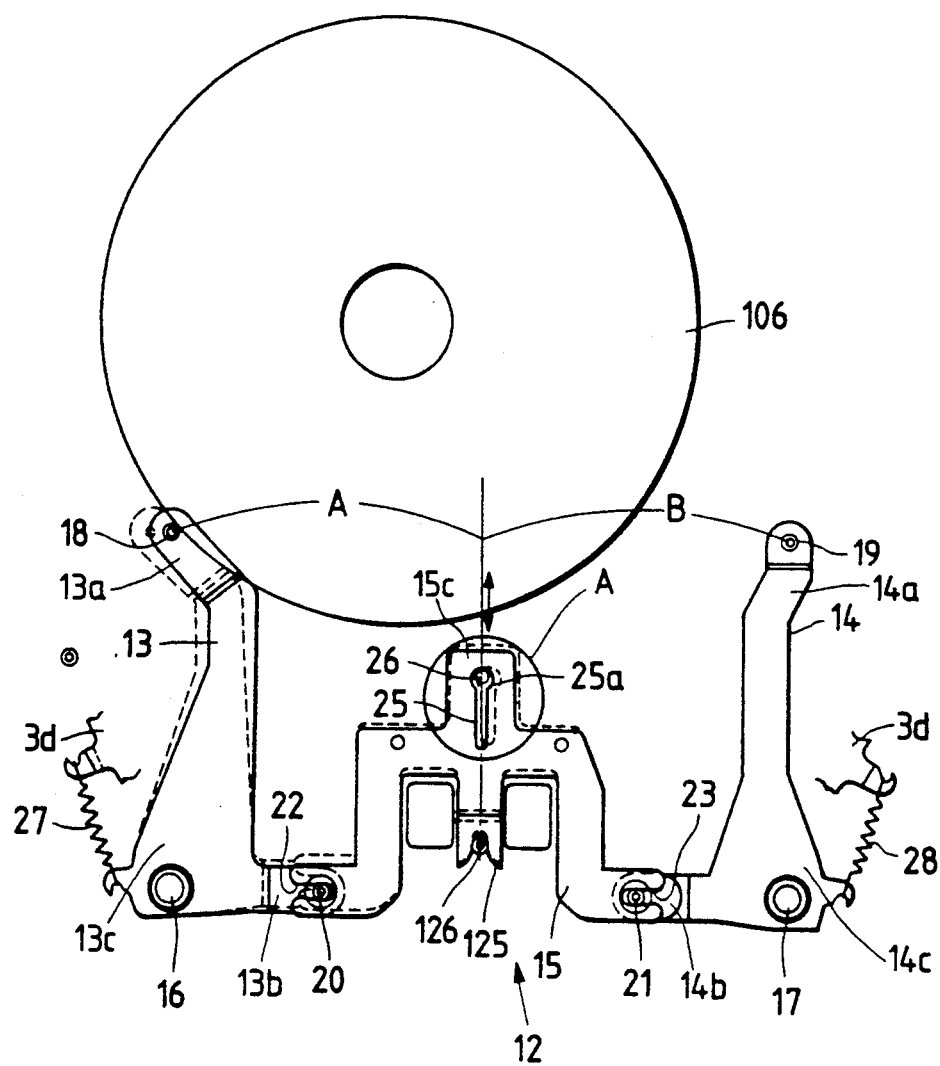
FIG. 4 is a plan view of the centering mechanism.

A centering mechanism 12 (FIG. 3) for positioning the disc 106 at the middle of the disc inserting opening 2 is provided inside the frame 3 and near the disc inserting opening 2. The centering mechanism 12, as shown in FIG. 4, comprises: a pair of centering arms 13 and 14; and a centering lever 15 interposed between with the centering arms 13 and 14.

Each of the centering arms 13 and 14 is substantially L-shaped. Each of the centering arms 13 and 14 has a tip end portion 13a, 14a and a rear end portion 13b, 14b. Each of the centering arms 13 and 14 is pivotally supported to the frame 3 about a support pin 16, 17 provided at a center portion 13c, 14c between the tip end portion 13a, 14a and rear end portion 13b, 14b extends close to the disc inserting opening 2. Centering pins 18 and 19 are provided at the tip end portions 13a and 14a. Accordingly, it is possible to regard the centering pins 18 and 19 as the contact portions like the tip end portions 13a and 14a. The rear end portions 13b and 14b have coupling pins 20 and 21 and are confronted with each other.

Figure 5:
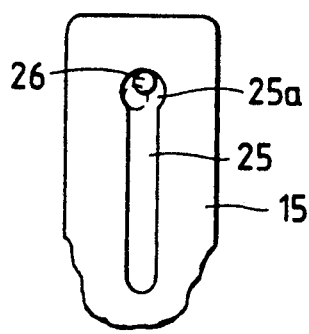
FIG. 5 is an enlarged view of the part A in FIG. 4.

The centering lever 15 is substantially inverted-W-shaped, and has coupling grooves 22 and 23 at both ends. The coupling grooves 22 and 23 are engaged with the coupling pins 20 and 21, respectively, so that the two centering arms 13 and 14 are coupled to the right and left ends of the centering lever 15. The centering lever 15 has in the middle a hole 25 which is elongated along the disc inserting direction. The elongated hole 25, as indicated at 25a in FIG. 5, is circular at the end closer to the disc inserting opening 2 (hereinafter referred to as "a circular head hole 25a"). A guide pin 26 embedded in the frame 3 is loosely fitted in the elongated hole 25 to be relatively movable within the elongated hole 25.

Also, the central portion 15c of the centering lever 15 extends toward the turntable. On the other side, an open guide groove 125 is formed at the disc inserting opening side.

A length of the guide groove 125 is shorter than that of the elongated hole 25. As a result, the guide pin 126 is disengaged from the guide groove 125 at an intermediate position where the centering lever 15 moves opposite the disc insertion direction (upward in FIG. 4).

Tension springs 27 and 28 are provided between the pair of centering arms 13 and 14 and projections 3d and 3d of the frame 3. The pair of centering pins 18 and 19 are biased toward each other by the tension springs 27 and 28 (FIG. 4). The centering pins 18 and 19 are equidistant (A=B) with respect to the center line passing through the center of the centering lever 15 at the initial or reference position (the position at which the guiding groove 125 engages the guiding pin 126).

It is assumed that the small diameter disc 106 is inserted into the disc inserting opening 2 in such a manner that it is shifted sidewards from the middle of the latter 2. In this case, the disc is brought into contact with one of the centering pins 18 and 19. When the disc 106 is brought into contact with the centering pin 18 as shown in FIG. 4, then the centering arm 13 is slightly turned counterclockwise about the supporting pin 16 against the elastic force of the tension spring 27. As a result, the centering lever 15 is slightly turned clockwise as a whole. As the centering lever 15 is turned in this manner, the guide pin 26 is caused to move from the center of the circular head hole 25a to abut against the lower left part (in FIG. 5) of the wall of the circular head hole 25a. Accordingly, the guide pin 26 cannot move in the elongated hole 25 relative to the centering lever; that is, the centering lever 15 cannot move towards the disc inserting opening 2. In this case, the distance between the centering pins 18 and 19 is slightly longer than 8 cm. Therefore, the centering arm 13 is slightly swung by the disc 106, but it is not swung further. Thus, the disc 106 shifted sidewards is caused to position at the middle of the disc inserting opening 2, being regulated by the centering pin 18.

When the large disc 101 is positioned at the middle of the disc inserting opening 2, then it is brought into contact with the two centering pins 18 and 19 at the same time. In this case, the centering arms 13 and 14 are turned about the supporting pins 16 and 17, respectively, to move both sides of the centering lever 15 towards the disc inserting opening 12 simultaneously. In this case, the guide pin 26 is not shifted in the widthwise direction of the elongated hole 25; that is, it is movable relative to the centering lever in the elongated hole 25. Therefore, the centering lever 15 is moved towards the disc inserting hole 2. As the centering lever 15 is moved in this manner, the centering arms 13 are further turned, so that the disc 101 can be inserted into the vehicle CD player.

As shown in FIG. 3, a turntable 29, on which a disc 106 is mounted, is provided on the supporting frame 4 substantially at the center. The turntable 29 is rotated by a spindle motor 30 provided below the supporting frame 4. A small-disc-shaped clamper 31 is arranged over the turntable 29. More specifically, the clamper 31 is coupled to the triangular end portion of a clamper arm 32 which is rockably connected to the rear end of the supporting frame 4. A tension spring 33 is connected between the clamper arm 32 and the supporting frame 4 to urge the clamper arm 32 towards the turntable 29.

Figure 6:
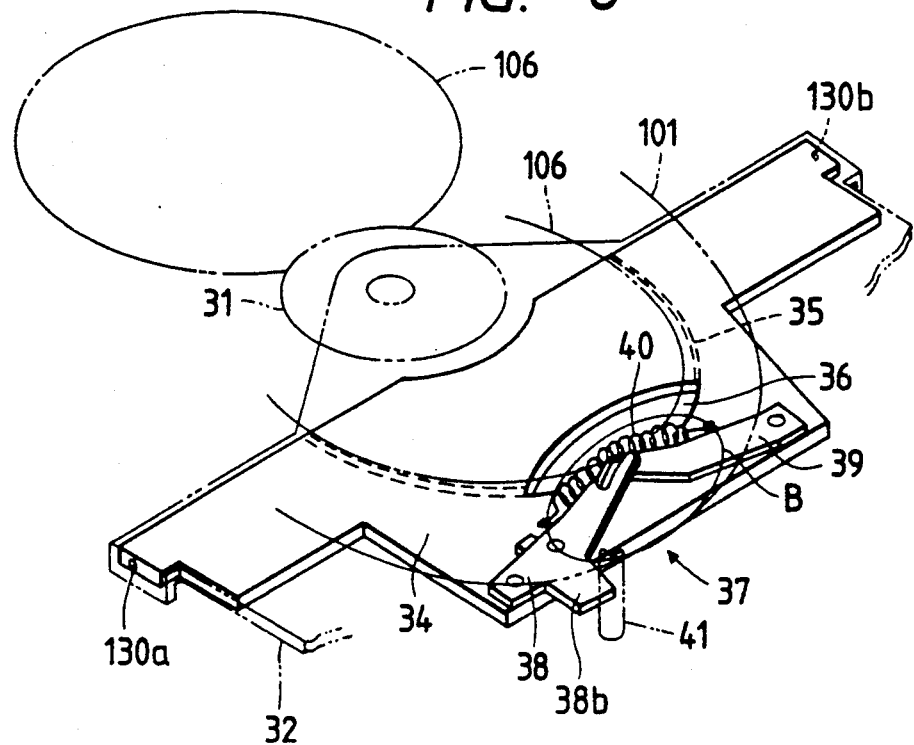
FIG. 6 is a perspective view showing an operating assist board and a depressing assist mechanism.
Figure 7:
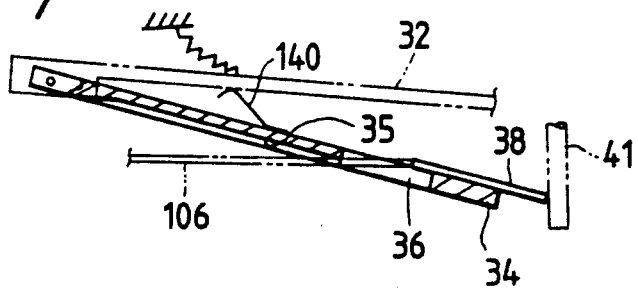
FIG. 7 is a sectional view of the operating assist board and the depressing assist mechanism.

As shown in FIGS. 6 and 7, an operating assist board 34 is provided below the clamper arm 32. When the smaller diameter 8 cm disc 106 is moved and positioned above the turntable 29, the operating assist board 34 operates a detecting pin 41 to mount the disc 106 on the turntable 29. The operating assist board 34 is swingably coupled to the pivot points 130 and 130 provided at both sides of the front end portion of the clamper arm 32, and is urged downwardly by a leaf spring 140. The operating assist board 34 has an arcuate disc recess 35 in the lower surface. The arcuate disc recess 35 is so shaped as to be receive an 8 cm disc. Therefore, when the small diameter disc 106 is moved towards the predetermined position, it is fitted in the disc recess 35. The disc recess 35 has a hole 36 in the rear end portion in such a manner that the hole 36 is confronted with the central portion of a depressing assist mechanism 37 which is provided above the operating assist board 34. Therefore, when the disc 106 is led into the disc recess 35, its end portion abuts against the depressing assist mechanism 37 to operate the latter 37.

When the large diameter 12 cm disc 101 is moved to the turntable 29, it is not fitted into the disc recess 35 because it is larger than the latter; that is, it is moved over the disc recess 35 as it is, and it is mounted on the turntable 29 after abutting against the detecting pin 41 with its periphery.

Figure 8:
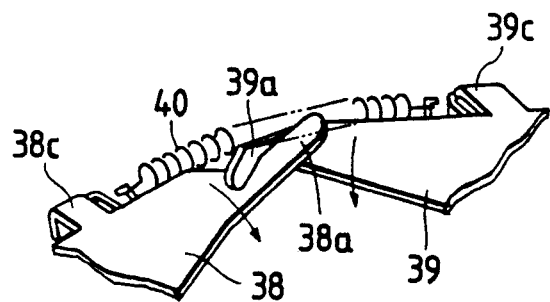
FIG. 8 is an enlarged view of the part B in FIG. 5.

The depressing assist mechanism 37 has a pair of swing arms 38 and 39 the base portion of which is pivotally mounted to the disc guide plate 34. Between the pair of swing arms 38 and 39 is mounted a tension spring 40 such that the tip ends 38a and 39a of the arms engage each other in shake-hand relation as shown in FIG. 8. When the tip ends 38a and 39a are pushed by the front edge of the small-diameter disc 106 through the hole 36, the pair of arms 38 and 39 pivot to open just like a door. A projecting strip 38b is continuously integral with the swing arm 38 and a detecting pin 41 is provided at a location where the projecting strip 38b opposes the detecting pin 41. The pivotal movement of the swing arm 38 causes the projecting strip 38 to depress the detecting pin 41.

Figure 9:
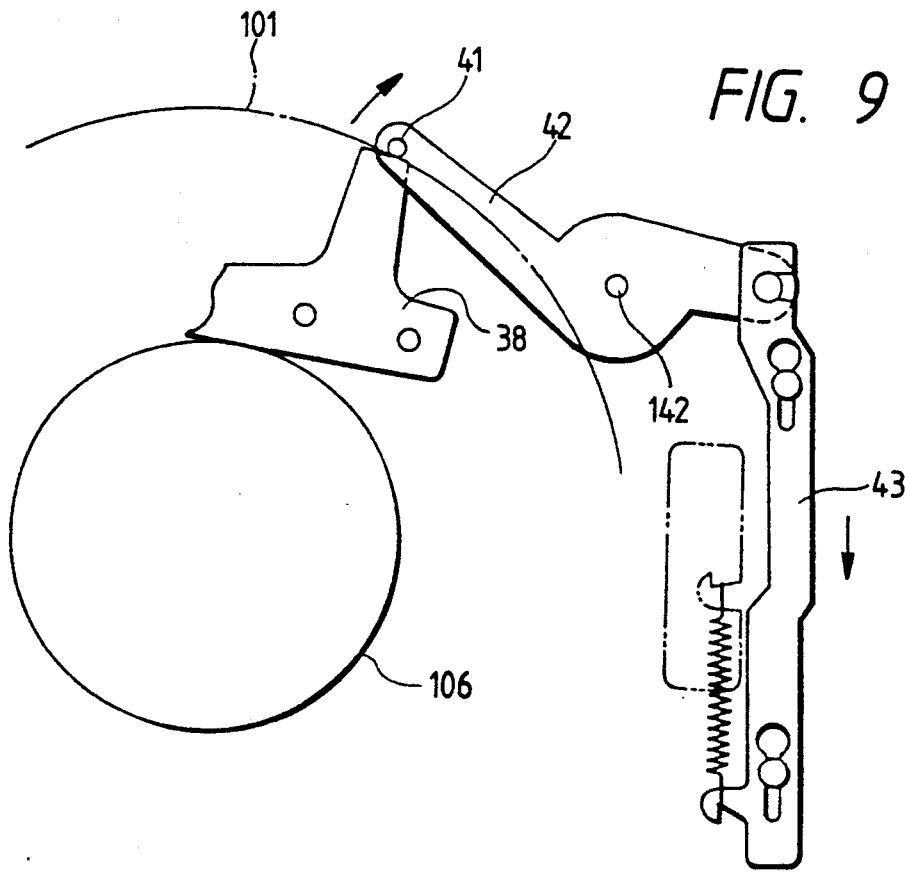
FIG. 9 is a plan view showing first and second links.

As shown in FIG. 9, the detecting pin 41 is mounted to one end of a first link 42 that forms part of a link mechanism pivotally mounted at the rear end of the frame 3. The other end of the first link 42 is connected to a second link 43 slidably disposed in the disc insertion direction. The detecting pin 41 is pushed by the arm 38 if the disc is the small disc 106, and is pushed directly by the disc if the disc is the large disc 101. When the detecting pin 41 is pushed by the disc, the second link 43 is caused to slide to allow the loading arm pivoting mechanism 7 to operate, thereby lowering the loading arm 8.

As shown in FIGS. 2 and 3, a lock pin 44 is provided on the side wall of the supporting frame 4 and projects from the side wall thereof A lock mechanism 45 is provided on the frame 3 from which the lock pin 44 projects The lock pin 44 remains locked by the lock mechanism 45 till the inserted disc is transferred to the predetermined position; therefore the supporting frame 4 is fixed to the frame 3. When the loading arm 8 is moved downwardly by the loading-arm pivoting mechanism 7, the lock mechanism 45 releases the lock pin 44, allowing the supporting frame 4 to be supported with shock absorbing effect on the frame 3 by means of a damper 5.

A movable lid 46 adapted to open and close, is attached to the frame 3 near the disc inserting opening 2. The movable lid 46 moves to the disc inserting opening 2 while the automotive CD player is in use, thereby preventing other disc from being accidentally inserted.

The operation of the disc reproducing apparatus will be described.

When the disc 106 of a small diameter is inserted into the disc inserting opening 2, a sensor 47 mounted to the front of a ceiling 3a detects the insertion of the disc 106 to cause a loading motor 10 to operate. At this time, if the disc 106 deviates from the center of the disc insertion opening 2 when it is inserted into the disc insertion opening 2, the disc abuts one of a pair of centering pins 18 and 19 and is positioned, as mentioned previously, in the middle of the disc insertion opening 2 by the centering mechanism 12.

When the disc is delivered between the drive roller 9a and the driven roller 9b to the turntable 29, the disc 106 moves into the disc guiding recess 35 of the disc guide plate 34 since the disc is eight centimeters in diameter. As shown in FIG. 7, when the disc 106 is inserted into the disc guiding recess 35, the front end of the disc 106 pushes the detecting pin 41 through the depressing assist mechanism 37 which is located on the other side of the hole 36. In other words, the disc 106 causes the swing arm 38 to pivot, which in turn causes the projecting strip 38 to depress the detecting pin 41.

Figure 10:
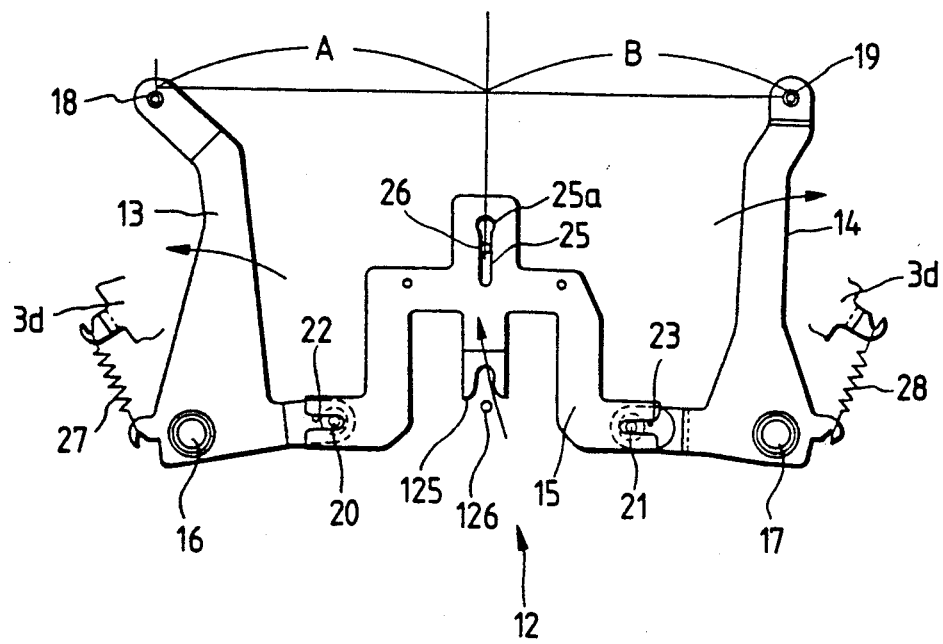
FIG. 10 is a plan showing the operation of the centering mechanism.

Then, when the large-diameter disc 101 is inserted, the disc 101 abuts the two centering pins 18 and 19 at the same time. The simultaneous abutment of pins 18 and 19 prevents the guide pin 26 from being off in the direction of the width of a elongated hole 25. Therefore, the centering lever 15 moves to the disc inserting opening 2. At this time, the elongated hole 25 moves while being guided by the guide pin 26 and the guiding groove 125 disengages the guide pin 126 as shown in FIG. 10 where the guide pin 26 disengages the large generally circular portion 25a of the elongated hole 2, then the centering lever 15 becomes ready to rotate about the guide pin 26. The centering lever 15 becomes ready to pivot about the guide pin 26. Then, the centering mechanism 12 looses its guiding effect by which the disc 101 is guided. The inserted disc is guided toward the clamper arm by the centering mechanism 12 provided to the frame which is supported in a floating condition.

When the disc 101 or 106 is guided to the clamp position, the detecting pin 41 is pushed by the periphery of the disc, which causes the first link 42 to pivot about a pin 142 as shown in FIG. 9 for causing the second link 43 to slide, thereby allowing the loading arm pivoting mechanism 7 to operate.

Thus, as shown in FIG. 3, as the laterally-projecting strip 32a descends together with loading arm 8 with which the strip 32a is in contact.

The CD player may vibrate or is tilted for one reason or another while the vehicle is running, the disc inserting opening 2 is also inclined. The turntable 29 of the CD player is mounted on the supporting frame 4 and the turntable 29 is supported to the frame 3 by means of the damper 5 with shock absorbing effect. For this reason, the center of the disc inserting opening is not always in registry with the center of the turntable 29. As a result, transferring the disc to the turntable 29 that is misaligned will not place the disc 101 exactly at the position where the disc should be centered.

However, in the present invention, shortly after the large-diameter disc 101 is inserted into the disc inserting opening 2, the large-diameter disc 101 is released from the centering mechanism 12 to transfer the disc to the centering mechanism on the frame side. Thus, the disc 101 is transferred onto the turntable 29, exactly where it is to be centered even if the player is titled. The urging force of the tension spring 33 causes the disc to descend. Thus the disc placed on the turntable 29 is depressed and fixed thereto by the clamper 31. The disc 101 and 106 are fixed to the turntable 29 by the clamper 31, the lock mechanism drivingly cooperates with the loading arm pivoting mechanism 7 to unlock the lock pin 44, the supporting frame 4 is supported to the frame 3 by means of the dampers 5 in a shock absorbing manner, thus the apparatus being brought into the floating condition. In this manner, the apparatus becomes ready for reproducing operation in which the spindle motor 30 is allowed to operate to rotate the turntable 29 carrying the disc thereon. When the disc 106 is rotated, a laser light is emitted from a reading head (not shown) to reproduce the music recorded in the disc 106, the reading head being moved in the radial direction of the disc 106.

As mentioned above, according to the invention, the centering mechanism which positions the disc at the center of the disc inserting opening, is disposed at the disc inserting opening. Thus, the small-diameter disc is guided by the tip ends of the centering arm to be positioned at the center of the disc inserting opening even if the disc is inserted with the center thereof being misaligned with the center of the opening.

The centering lever of the centering mechanism is provided with a guiding groove which engages the guide pin. As soon as the centering operation at the disc inserting opening starts, the guide pin disengages the guiding groove to make the centering lever free to rotate. Thus, the large-diameter disc is aligned its initial centering by the centering mechanism, but the initial centering operating is terminated as soon as the disc starts to be transferred toward the turntable, leaving the direction control with the centering mechanism on the floating supporting side. Thus, the large-diameter disc can be reliably transferred to the clamp position even when the disc player undergoes vibration and inclination.

Figure 11A:
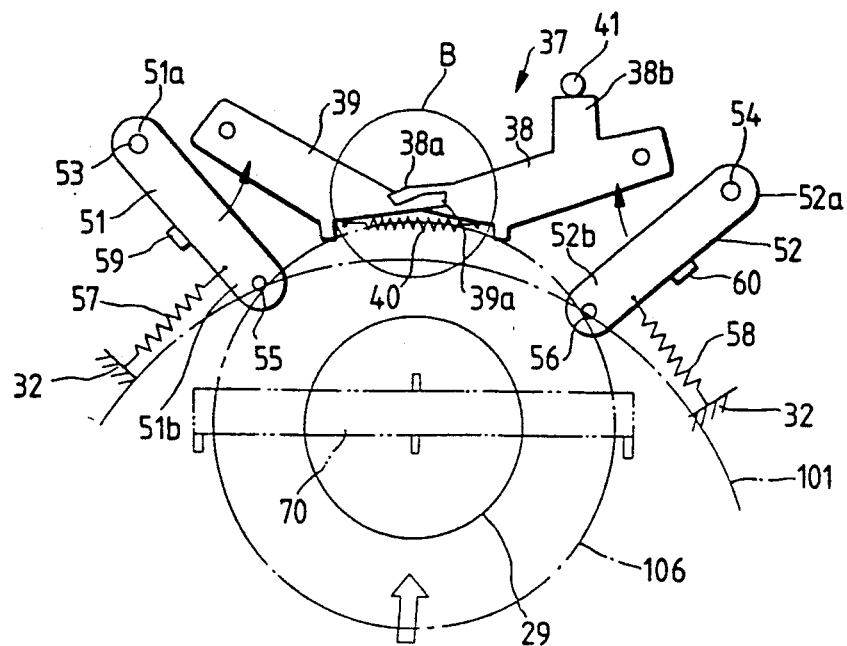
FIG. 11a to 11c show the stopper mechanism particularly for a small disc.
Figure 11B:
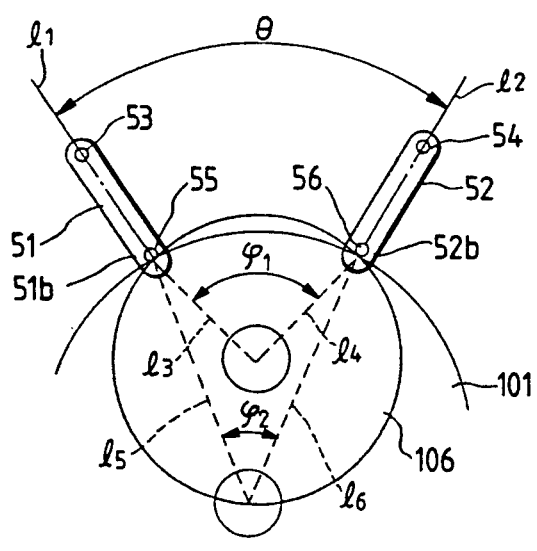
Figure 11C:
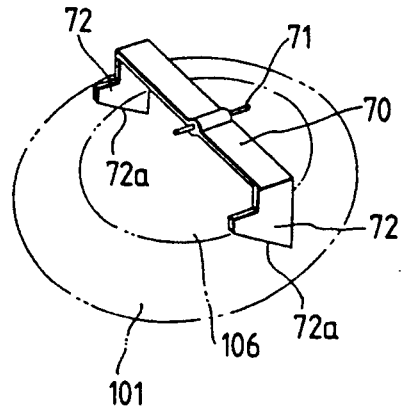

The smaller-disc stopping mechanism in relation to the foregoing system will be explained particularly referring to FIGS. 11a to 11c. A pair of stopper arms 51 and 52, as shown in FIGS. 11a to 11c, are disposed in a spaced and oblique relation on the underside of the clamper arm 32. The pair of stopper arms 51 and 52, which form a positioning device for positioning the small-diameter disc onto the clamp position in the form of an elongated flat plate, is disposed at a position further past the center of the turntable 29 in the disc insertion direction. The clamper arm 32 is pivotally mounted to base ends 51a and 52a of the pair of stopper arms 51 and 52 by means of supporting pins 53 and 54. To the tip ends 51b and 52b of the stopper arms 51 and 52 are mounted pins 55 and 56 as abutments that abuts the periphery of the disc 101 and 106. The stopper arms 51 and 52 are disposed such that when the small-diameter disc 106 takes up the clamp position at the center of the turntable 29, with the periphery of the disc 106 abutting the pins 55 and 56, the angle $\theta$ made by the longitudinal axes $l_1$ and $l_2$ extending from the base ends 51a and 52a to the tip ends 51b and 52b is somewhere between the angle $Y_1$ made by the lines $l_3$ and $l_4$ in the radial direction on the small-diameter disc 106 and the angle $Y_2$ made by the lines $l_5$ and $l_6$ in the radial direction of the large-diameter disc 101.

The pair of stopper arms 51 and 52 are urged toward the disc inserting opening by tension springs 57 and 58 which are secured to the clamper arm 32. Stoppers 59 and 60 may be provided to position the pair of stopper arms 51 and 52 at the aforementioned clamp position. A pivot arm 70 as shown in FIGS. 11a and 11c is provided to the clamper arm 32 and has a pivot pin 71 provided at its center about which the pivot arm 70 pivots to left and right. The pivot arm 70 is provided with legs 72 and 72 which have beveled surfaces 72a and are spaced apart by a distance greater than the diameter of the small-diameter disc but smaller than that of the large-diameter disc. Thus, the small-diameter disc 106 passes between the legs but the large-diameter disc 101 is directed downwardly by the beveled surfaces 72a and passes without activating a later described depressing assist mechanism 37.

On the underside of the clamper arm 32 is provided the depressing assist mechanism 37 in stepped relation such that the mechanism 37 does not abut the pair of stopper arms 51 and 52. The depressing assist mechanism 37 has a pair of pivot arms 38 and 39 the base ends of which are pivotally mounted to the clamper arm 32. The pair of pivot arms 38 and 39 are connected to a tension spring 40 such that the tip ends 38a and 39a engage each other in shake hand relation as shown in FIG. 8. When the small-diameter disc 106 takes up the central clamp position on the turntable 29, the tip ends 38c and 39c are pushed by the periphery of the disc 106, so that the pair of pivot arms 38 and 39 pivot, respectively.

The pivot arm 38 is formed a projecting strip 38b continuously integral therewith. A detecting pin 41 is disposed to oppose the projecting strip 38b and the pivot arm 38 pivots to cause the projecting strip 38b to depress the detecting pin 41.

The large-diameter disc 101 being transferred toward the turntable 29 passes the depressing assist mechanism 37 with the aid of the pivot arm 70 mounted to the clamper arm 32 and directly pushes the detecting pin 41.

The operation of the disc reproducing apparatus will be described below.

When the disc 106 of a small diameter is inserted into the disc inserting opening 2, the sensor 47 mounted to the front of the top plate 3a detects the insertion of the disc 106 to cause a loading motor 10 to operate. At this time, if the small-diameter disc 106 deviates from the center of the disc insertion opening 2 when it is inserted into the disc insertion opening 2, the disc abuts one of the pair of centering pins 18 and 19 and is positioned as mentioned previously in the middle of the disc insertion opening 2 by the centering mechanism 12. The loading motor 10 drives the drive roller 9a into rotation which in turn cooperates with the driven roller 9b to grasp the disc between them, delivering the disc to the turntable 29. When the small-diameter disc 106 arrives at the middle of the turntable passing between the pair of legs 72 and 72 of the pivot arm 70, the disc 106, as mentioned previously, abuts the pins 55 and 56 of the stopper arms 51 and 52 to stop. At this time, the front end of the disc 106 causes the depressing assist mechanism 37 to pivot, thereby depressing the detecting pin 41 by means of the projecting strip 38b.

The large-diameter disc 101 inserted through the disc inserting opening 2 is transferred toward the turntable 29, is oriented downwardly by the stopper arm 70, and abuts the pins 55 and 56 of the stopper arms 51 and 52. The large-diameter disc 101 advances while causing the stopper arms 51 and 52 to pivot against the springs 57 and 58 in a direction opposite to the disc inserting opening 2, and then abuts the stopper to stop, thereby being positioned at the central clamp position. At this time, the disc 101 depresses the detecting pin 41.

When the detecting pin is depressed by the large- or small-diameter disc 101 or 106, the first link 42 pivots about the pin 142 as shown in FIG. 9, which in turn causes the second link 43 to pivot, thereby allowing the loading arm pivot mechanism 7 to operate. Thus, as shown in FIG. 3, as the laterally-projecting strip 32a descends together with the loading arm 8 with which the strip 32a is in contact; the clamper arm 32 is allowed to descend with the aid of the tension spring 33 to depress the disc 101 or 106 placed on the turntable 29 by means of the clamper 31; the lock mechanism 45 interlocks with the loading arm pivot mechanism 7 to unlock the lock pin 44; and the supporting frame 4 is supported in the shock absorbing manner on the frame 3 with the aid of the damper. In this manner, the apparatus becomes ready for reproducing the disc, the spindle motor 30 operates to drive the turntable 29 thus the disc 106 or 101 into rotation. When the disc 106, or 101 is rotated, the reading head emits a laser light to reproduce a music recorded in the disc while moving radially above the disc 106.

As mentioned above, according to the present invention, a pair of stopper arms is pivotally disposed; when the stopper arm abuts the small-diameter disc positioned at the central clamp position on the turntable, the angle made by the longitudinal axes of the stopper arms is smaller than the angle made by the two radial direction of the small-diameter disc, but is greater than the angle made by the two radial directions when the stopper arm abuts the large-diameter disc. Thus, the small-diameter disc may be reliably positioned at its supposed clamp position.

When the large-diameter disc is transferred toward the turntable, the disc pushes the pair of stopper arms while causing the stopper arms to pivot in the direction of advancement of the disc, and thereafter the disc abuts the stopper elements to be blocked its advancement, thereby being positioned on the clamp position. Thus, regardless of the size of disc, small- or large-diameter, the disc can be reliably positioned through the use of simple construction.

We claim:

1. A disc reproducing apparatus in which when a disc inserted through a disc inserting opening arrives at a predetermined position within a player, a clamper arm operates to fix the disc onto a turntable, and information recorded in the disc is reproduced by rotating the turntable, said disc reproducing apparatus comprising: a centering mechanism means for directing the inserted disc to the center of the disc inserting opening and being provided in the vicinity of the disc inserting opening; said centering mechanism means including a pair of centering arms (13, 14) which are pivotally supported in a spaced relation and provided with a pair of abutments, and a centering lever (15) which is connected between said pair of centering arms (13, 14) and reciprocally movable in the disc insertion direction; said centering lever (15) being provided with a guiding groove means 125 for guiding the operation thereof, which engages a guiding pin means 126 provided on a frame side of the disc inserting opening; and when the inserted disc abuts the pair of centering arms (13, 14) to push the centering lever (15) in the disc insertion direction, said guiding pin means (126) disengages with said guiding groove means (125) to release the centering lever 15 at a position intermediate the stroke of the movement thereof.

2. A disc reproducing apparatus in which a large- or small-diameter disc inserted through a disc inserting opening is transferred to a predetermined position within a player, a clamper arm extending over a turntable on which the disc is placed being operated to fix the disc onto the turntable, and information recorded in the disc being reproduced by rotating the turntable, said disc reproducing apparatus comprising: a pair of stopper arms pivotally attached to said clamper arm, each of said stopper arms having an abutment which abuts the periphery of either of the large-diameter and the small-diameter discs; said pair of stopper arms is attached to said clamper at a predetermined location such that when said small-diameter disc arrives at said predetermined position on the turntable, an acute angle defined between the longitudinal axes of the respective stopper arms is smaller than the angle defined between the radial lines connecting each abutment and the center of the small-diameter disc, but greater than the angle defined between the radial lines connecting each abutment and the enter of the large-diameter disc when said large-diameter disc is placed.

* * * * *